United States Patent
Lee et al.

(10) Patent No.: US 9,231,253 B2
(45) Date of Patent: Jan. 5, 2016

(54) BINDER FOR ELECTRODE OF LITHIUM BATTERY, BINDER COMPOSITION INCLUDING THE BINDER, AND LITHIUM BATTERY CONTAINING THE BINDER

(71) Applicant: Samsung SDI Co., Ltd., Yongin-si, Gyeonggi-Do (KR)

(72) Inventors: Beom-Wook Lee, Yongin (KR); Hye-Sun Jeong, Yongin (KR); Hye-Ran Lee, Yongin (KR)

(73) Assignee: Samsung SDI Co., Ltd., Gyeonggi-Do (KR)

( * ) Notice: Subject to any disclaimer, the term of this patent is extended or adjusted under 35 U.S.C. 154(b) by 308 days.

(21) Appl. No.: 13/830,419

(22) Filed: Mar. 14, 2013

(65) Prior Publication Data

US 2014/0106217 A1  Apr. 17, 2014

(30) Foreign Application Priority Data

Oct. 11, 2012  (KR) .................. 10-2012-0113029

(51) Int. Cl.
*H01M 4/62* (2006.01)
*H01M 10/052* (2010.01)

(52) U.S. Cl.
CPC .............. *H01M 4/622* (2013.01); *H01M 4/621* (2013.01); *H01M 10/052* (2013.01)

(58) Field of Classification Search
CPC ..... H01M 4/62; H01M 4/622; H01M 10/052; H01M 4/131; H01M 4/1391; H01M 4/366; H01M 4/621
See application file for complete search history.

(56) References Cited

U.S. PATENT DOCUMENTS

| | | | | |
|---|---|---|---|---|
| 6,024,895 | A * | 2/2000 | Shimizu et al. ............... | 252/500 |
| 2002/0086206 | A1* | 7/2002 | Fauteux et al. ............... | 429/215 |
| 2011/0123863 | A1 | 5/2011 | Choi et al. | |
| 2011/0143206 | A1* | 6/2011 | Muthu et al. .................. | 429/231 |
| 2013/0112928 | A1* | 5/2013 | Omote et al. ................. | 252/511 |

FOREIGN PATENT DOCUMENTS

| | | | |
|---|---|---|---|
| JP | 01-132045 A | 5/1989 | |
| JP | 2010-018673 A | 1/2010 | |
| KR | 10-0441525 B1 | 7/2004 | |
| KR | 10-2008-0074241 A | 8/2008 | |
| KR | 10-2011-0056151 A | 5/2011 | |
| WO | WO-2012/008539 A1 * | 1/2012 | .............. H01M 4/62 |

\* cited by examiner

*Primary Examiner* — Kenneth Douyette
(74) *Attorney, Agent, or Firm* — Knobbe Martens Olson & Bear LLP

(57) ABSTRACT

In an aspect, a binder for a lithium battery electrode, a binder composition including the binder, and a lithium battery including the binder are provided. The binder may include a water-soluble electroconductive polymer having a carboxylate functional group.

12 Claims, 1 Drawing Sheet

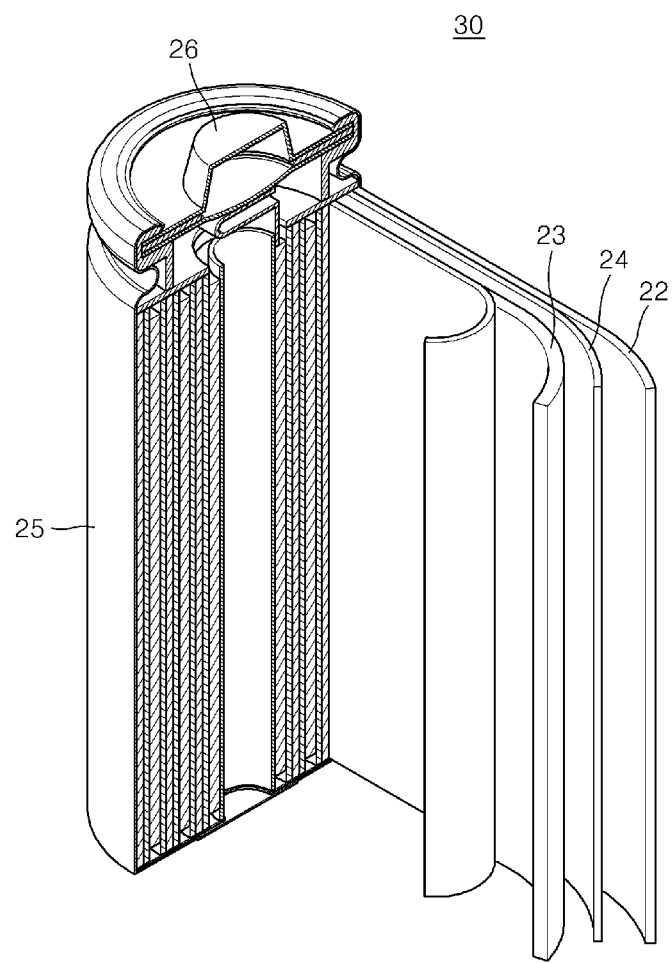

BINDER FOR ELECTRODE OF LITHIUM BATTERY, BINDER COMPOSITION INCLUDING THE BINDER, AND LITHIUM BATTERY CONTAINING THE BINDER

CROSS-REFERENCE TO RELATED APPLICATIONS

This application claims priority to and the benefit of Korean Patent Application No. 10-2012-0113029 filed on Oct. 11, 2012, in the Korean Intellectual Property Office, the disclosure of which is incorporated in its entirety herein by reference.

BACKGROUND

1. Field

This disclosure relates to a binder for a lithium battery electrode, a binder composition including the binder, and a lithium battery including the binder.

2. Description of the Related Technology

Along with the trend toward small, light-weight, and high-performance portable devices, the demand for lithium batteries with a higher capacity and a longer lifetime is increasing. Accordingly, the development of materials and processes for achieving a high capacity for positive electrodes of lithium batteries is under investigation. For example, using an active material with a higher capacity, an electrode mixture with an increased density and a membrane with an increased thickness have been suggested for higher-capacity batteries. With regard to negative electrodes, research to replace existing graphite-based active materials with a high-capacity material, such as silicon, a silicon-silicon oxide composite material, a silicon-graphite composite material, a tin (Sn)-based material, or an alloy thereof has been undertaken.

To improve the capacity, lifetime, and stability of lithium batteries, other materials for lithium batteries, including an electrolyte, a separator, and a binder, are also being actively researched.

SUMMARY

Some embodiments provide a binder for an electrode of a lithium battery that improves a capacity of the lithium battery.

Some embodiments provide a lithium battery including the binder.

Additional aspects will be set forth in part in the description which follows and, in part, will be apparent from the description, or may be learned by practice of the presented embodiments.

Some embodiments provide a binder for a lithium battery electrode including a water-soluble electroconductive polymer having a carboxylate functional group in a main chain.

In some embodiments of the binder, the carboxylate functional group may be represented by —COO$^-$M$^+$ or —R—COO$^-$M$^+$, where R is a linear or branched C1-C10 saturated or unsaturated hydrocarbon group, and M$^+$ is a metal cation or an alkylated quaternary ammonium ion.

In some embodiments of the binder, R may be a hydrocarbon group including at least one of a carbonyl group, an oxy group, a carbonyloxy group, an aminocarbonyl group, an aminosulfonyl group, a mercapto group, a sulfinyl group, a sulfonyl group, a sulfonyloxy group, and an amine group.

In some embodiments of the binder, the water-soluble electroconductive polymer may include at least one of polyaniline (PANI), polypyrrole (PPY), polythiophene, (PT), poly(thienylene vinylene) (PTV), poly(3,4-ethylenedioxythiophene) (PEDOT), poly(isothianaphthene) (ITN), poly(p-phenylene sulfide) (PPS), polyphenylene (PP), poly(p-phenylene vinylene) (PPV), and copolymers thereof.

In some embodiments of the binder, the water-soluble electroconductive polymer may be self-doped with the carboxylate functional group.

In some embodiments of the binder, the water-soluble electroconductive polymer may further include a functional group including at least one of a carboxyl group, a phosphoric acid group, a phosphate group, a sulfonic acid group, and a sulfonate group. In this regard, the water-soluble electroconductive polymer may be self-doped with at least one of the phosphoric acid group, the phosphate group, the sulfonic acid group, and the sulfonate group.

In some embodiments of the binder, the water-soluble electroconductive polymer may have an electrical conductivity of about 0.01 S/cm or greater.

In some embodiments of the binder, an amount of the water-soluble electroconductive polymer may be from about 50 wt % to about 100 wt % based on a total weight of the binder.

Some embodiments provide a binder composition for a lithium battery electrode includes any of the binders described above, and an aqueous solvent.

In some embodiments of the binder composition, a solid content of the binder composition may be about 1 wt % or greater.

In some embodiments of the binder composition, the aqueous solvent may be water, a polar organic solvent, or a mixture thereof. In some other embodiments, the aqueous solvent may be water.

Some embodiments provide a lithium battery including: a positive electrode; a negative electrode disposed opposite to the positive electrode; and an electrolyte disposed between the positive electrode and the negative electrode, wherein at least one of the positive electrode and the negative electrode includes any of the binders described above.

Some embodiments provide a binder for a lithium battery electrode, the binder comprising a water-soluble electroconductive polymer having a a moiety represented by the by Formula 10:

Formula 10 wherein:
each L$^1$ may be independently selected from the group consisting of:

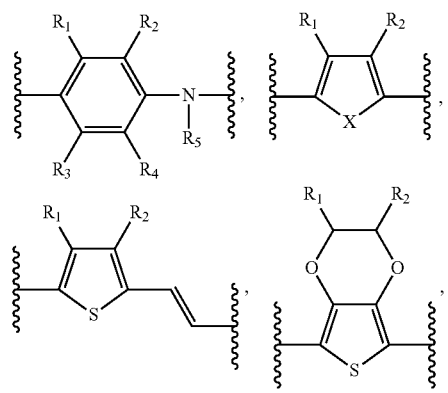

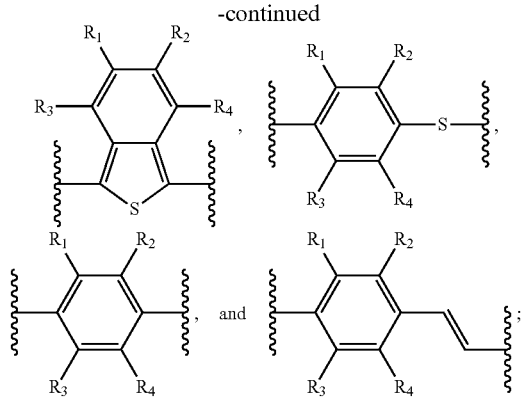

each X may be at least one of NH, N-alkyl, or S (sulfur);
$R_1$, $R_2$, $R_3$, and $R_4$ may each independently be a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, $R_2$, $R_3$, and $R_4$ is —COOH, —R—COOH, —COO$^-$M$^+$ or —R—COO$^-$M$^+$;
each $R_5$ may independently be a hydrogen (H), —R—COO$^-$M$^+$, or —R—$SO_3^-$M$^+$;
each R independently comprises at least one of a carbonyl group, an oxy group, a carbonyloxy group, an aminocarbonyl group, an aminosulfonyl group, a mercapto group, a sulfinyl group, a sulfonyl group, a sulfonyloxy group, or a secondary amine group; each M$^+$ may be a metal cation or an alkylated ammonium ion; and n may be an integer from 10 to 10,000.

BRIEF DESCRIPTION OF THE DRAWING

These and/or other aspects will become apparent and more readily appreciated from the following description of the embodiments, taken in conjunction with the accompanying drawing in which:

FIG. 1 is a schematic view of a structure of a lithium battery according to an embodiment.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Some embodiments provide a binder for an electrode of a lithium battery includes a water-soluble electroconductive polymer having a carboxylate functional group in a main chain.

In some embodiments, the binder for a lithium battery electrode may have a high electrical conductivity, and thus may include no or a reduced amount of a conducting agent, and thus a relatively large amount of an active material, which may lead to a high capacity. In some embodiments, the binder also has a strong binding strength to a current collector and the active material, and may be used in a reduced amount relative to existing binders, which also allows use of a relatively large amount of the active material, and further increases capacity. In some embodiments, the binder may be water-soluble and environmentally friendly, and thus it may be readily applicable as it is to an aqueous process of manufacturing electrodes.

In some embodiments, the water-soluble electroconductive polymer may include a π-conjugated polymer having an electrical conductivity as the main chain. In some embodiments, the water-soluble electroconductive polymer may include, as the polymer main chain, at least one of polyaniline, polypyrrole, polythiophene, poly(thienylene vinylene), poly(3,4-ethylenedioxythiophene), poly(isothianaphthene), poly(p-phenylene sulfide, polyphenylene, and poly(p-phenylene vinylene).

In some embodiments, the water-soluble electroconductive polymer may include a carboxylate functional group as a substituent in such a polymer main chain. In some embodiments, including a carboxylate functional group as part of the water-soluble electroconductive polymer may improve solubility to water, the dispersibility and coating characteristics of an electrode slurry prepared by mixing the binder, an active material, and other additives, and the uniformity of a film formed from the electrode slurry. In some embodiments, the water-soluble electroconductive polymer may improve the binding strength to the active material and current collector and may have an electrical conductivity by being self-doped with the carboxylate functional group as described above.

In some embodiments, the carboxylate functional group may be represented by, for example, —COO$^-$M$^+$ or —R—COO$^-$M$^+$, where R is a linear or branched C1-C10 saturated or unsaturated hydrocarbon group, and M$^+$ is a metal cation or an alkylated ammonium ion.

In some embodiments, M$^+$ as a metal cation may be, for example, an alkali metal ion, an alkali earth metal, a transition metal ion, or a post-transition metal ion. In some embodiments, M$^+$ may be an alkylated ammonium ion, for example, a secondary, tertiary, or quaternary ammonium ion.

In some embodiments, M$^+$ may be one of an alkali metal ion, such as lithium ion (Li$^+$), sodium ion (Na$^+$), or potassium ion (K$^+$); an alkali earth metal, such as magnesium ion (Mg$^{2+}$) or calcium ion (Ca$^{2+}$); a transition metal ion, such as Zn$^{2+}$; a post-transition metal ion, such as Al$^{3+}$; and a secondary, tertiary, or quaternary ammonium ion resulting from hydrogenation or alkylation of a primary, secondary, or tertiary amine compound, such as ammonium hydroxide, methylamine, dimethylamine, trimethylamine, ethylamine, diethylamine, triethylamine, propylamine, dipropylamine, butylamine, pentylamine, hexylamine, cyclohexylamine, monomethanolamine, dimethanolamine, trimethanolamine, monoethanolamine, diethanolamine, or triethanolamine.

In some other embodiments, R may include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), and a secondary amine group (—NH—).

In some embodiments, the water-soluble electroconductive polymer with the carboxylate functional group in polyaniline may be include a moiety represented by Formula 1 below:

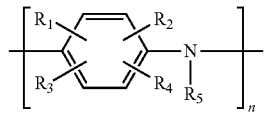

Formula 1

In Formula 1 above, at least one of $R_1$, $R_2$, $R_3$, and $R_4$ may be each independently —COOH, —R—COOH, —COO$^-$M$^+$ or —R—COO$^-$M$^+$, wherein R may be a linear or branched C1-C10 saturated or unsaturated hydrocarbon group; and M$^+$ may be a metal cation or an alkylated ammonium ion. In some embodiments, R may include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); and n may be an integer from 10 to 10,000.

In some embodiments, $R_1$, $R_2$, $R_3$, and $R_4$ may each independently be a hydrogen (H), —R—SO$_3$$^-$M$^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, $R_2$, $R_3$, and $R_4$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a sulfanyl group (—S—), a sulfinyl group (—S(O)—), a sulfonyl group (—SO$_2$—), a sulfonyloxy group (—SO$_2$—O— or —O—SO$_2$—), or a secondary amine group (—NH—).

In some embodiments, each $R_5$ may independently be a hydrogen (H), —R—COO$^-$M$^+$, or —R—SO$_3$$^-$M$^+$, where each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000. In some embodiments, $R_1$, $R_2$, $R_3$, and $R_4$ may each independently be a hydrogen (H), —SO$_3$$^-$Na$^+$, —OCH$_3$, —R—COOH, —R—COO$^-$Na$^+$, —COOH, or —COO$^-$Na$^+$, provided at least one of $R_1$, $R_2$, $R_3$, and $R_4$ is —R—COOH, —R—COO$^-$Na$^+$, —COOH, or —COO$^-$Na$^+$; and $R_5$ is hydrogen (H).

In some other embodiments, a structure of the water-soluble electroconductive polymer with the carboxylate functional group in polypyrrole, poly(N-alkylpyrrole), or polythiophene may include a moiety represented by Formula 2 below.

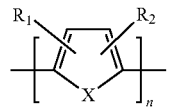

Formula 2

In Formula 2 above, X may be at least one of NH, N-alkyl, or S; and $R_1$, and $R_2$ may each independently be a hydrogen (H), —R—SO$_3$$^-$M$^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, and $R_2$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000. In some embodiments, X may be NH or S (sulfur).

In some other embodiments, a structure of the water-soluble electroconductive polymer with the carboxylate functional group in polythienylenevinylene may include a moiety represented by Formula 3 below:

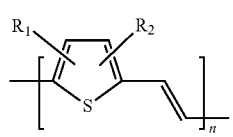

Formula 3

In Formula 3 above, $R_1$, and $R_2$ may each independently be a hydrogen (H), —R—SO$_3$$^-$M$^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, and $R_2$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000.

In some other embodiments, a structure of the water-soluble electroconductive polymer with the carboxylate functional group in poly(3,4-ethylenedioxythiophene) may include a moiety represented by Formula 4 below:

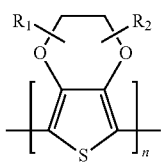

Formula 4

In Formula 4 above, $R_1$, and $R_2$ may each independently be a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, and $R_2$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000.

In some other embodiments, a structure of the water-soluble electroconductive polymer with the carboxylate functional group in poly(isothianaphene) may include a moiety represented by Formula 5 below:

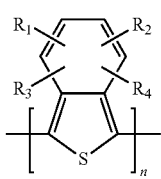

Formula 5

In Formula 5 above, $R_1$, $R_2$, $R_3$, and $R_4$ may each independently be a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, $R_2$, $R_3$, and $R_4$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000. In some embodiments, $R_1$, $R_2$, $R_3$, and $R_4$ may each independently be a hydrogen (H), —SO$_3^-$Na$^+$, —OCH$_3$, —R—COOH, —R—COO$^-$Na$^+$, —COOH, or —COO$^-$Na$^+$ provided at least one of $R_1$, $R_2$, $R_3$, and $R_4$ is —R—COOH, —R—COO$^-$Na$^+$, —COOH, or —COO$^-$Na$^+$.

In some other embodiments, a structure of the water-soluble electroconductive polymer with the carboxylate functional group in poly(p-phenylene sulfide) may include a moiety represented by Formula 6 below:

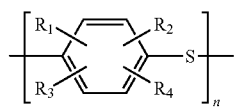

Formula 6

In Formula 6 above, $R_1$, $R_2$, $R_3$, and $R_4$ may each independently be a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, $R_2$, $R_3$, and $R_4$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000. In some embodiments, $R_1$, $R_2$, $R_3$, and $R_4$ may each independently be a hydrogen (H), —SO$_3^-$Na$^+$, —OCH$_3$, —R—COOH, —R—COO$^-$Na$^+$, —COOH, or —COO$^-$Na$^+$ provided at least one of $R_1$, $R_2$, $R_3$, and $R_4$ is —R—COOH, —R—COO$^-$Na$^+$, —COOH, or —COO$^-$Na$^+$.

In some other embodiments, a structure of the water-soluble electroconductive polymer with the carboxylate functional group in polyphenylene may include a moiety represented by Formula 7 below:

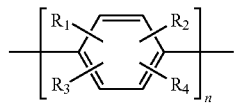

Formula 7

In Formula 7 above, $R_1$, $R_2$, $R_3$, and $R_4$ may each independently be a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, $R_2$, $R_3$, and $R_4$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000. In some embodiments, R$_1$, R$_2$, R$_3$, and R$_4$ may each independently be a hydrogen (H), —SO$_3^-$Na$^+$, —OCH$_3$, —R—COOH, —R—COO$^-$Na$^+$, —COOH, or —COO$^-$Na$^+$ provided at least one of R$_1$, R$_2$, R$_3$, and R$_4$ is —R—COOH, —R—COO$^-$Na$^+$, —COOH, or —COO$^-$Na$^+$.

In some other embodiments, a structure of the water-soluble electroconductive polymer with the carboxylate functional group in poly(p-phenylene vinylene) may include a moiety represented by Formula 8 below:

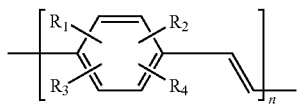

Formula 8

In Formula 8 above, R$_1$, R$_2$, R$_3$, and R$_4$ may each independently be a hydrogen (H), —R—SO$_3^-$M$^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of R$_1$, R$_2$, R$_3$, and R$_4$ is —COOH, —R—COOH, —COO$^-$M$^+$ or —R—COO$^-$M$^+$; each R may independently include at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ may be a metal cation or an alkylated ammonium ion; and n may be an integer from 10 to 10,000. In some embodiments, R$_1$, R$_2$, R$_3$, and R$_4$ may each independently be a hydrogen (H), —SO$_3^-$Na$^+$, —OCH$_3$, —R—COOH, —R—COO$^-$Na$^+$, —COOH, or —COO$^-$Na$^+$ provided at least one of R$_1$, R$_2$, R$_3$, and R$_4$ is —R—COOH, —R—COO$^-$Na$^+$, —COOH, or —COO$^-$Na$^+$.

In Formulae 1 to 8 above, n indicates the number of repeating units of the polymer, and may be an integer from 10 to 10,000, and in some embodiments, an integer from 100 to 1000.

In Formula 1 to 8, M$^+$ in —COO$^-$M$^+$, —R—COO$^-$M$^+$, and —R—SO$_3^-$M$^+$ may be each independently a metal cation or an alkylated ammonium ion as described above.

In some embodiments, the water-soluble electroconductive polymers may be homopolymers where each individual moiety represented by Formulae 1 to 8 has the same substituents. In some embodiments, the water-soluble electroconductive polymers may be copolymers polymerized from two or more types of monomers where two or more individual moieties represented by Formulae 1 to 8 have different substituents.

For example, the structure of Formula 1 may be a structure selected from among different combination structures, for example, represented by Formulae 9 and 10 below:

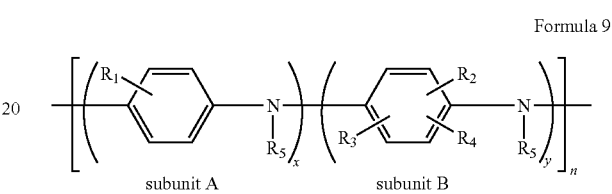

Formula 9

In Formula 9, R$_1$, R$_2$, R$_3$, R$_4$, R$_5$, and n are as defined in conjunction with Formula 1 above provided that subunit A and subunit B are not identical; x and y, which indicate a molar ratio of monomers in the copolymer, satisfy that x+y=1. For example, R$_1$ may be fluorine and R$_2$, R$_3$, and R$_4$ may each be hydrogen.

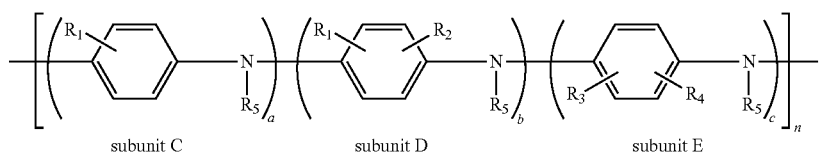

Formula 10

In Formula 10 above, R$_1$, R$_2$, R$_3$, R$_4$, R$_5$, and n are as defined in conjunction with Formula 1 above provided that at subunit C is not identical to at least one of subunit D and subunit E; and a, b, and c, which indicate a molar ratio of monomers in the copolymer, satisfy that a+b+c=1. For example, R$_1$ may be fluorine, R$_2$ may be chlorine, and R$_3$, and R$_4$ may each be hydrogen.

Unlike the monopolymers of Formulae 1 to 8 the copolymers of Formulae 1 to 8 may be prepared from different monomer units where a ratio of the different monomer units is advantageously adjusted to optiomize the polymer properties.

In some embodiments, the polymers of Formulae 1 to 8 and the copolymers thereof (for example, represented by Formulae 9 and 10) may be polymerized using any of a variety of methods, for example, electrode polymerization using an electrode in an electrolyte, chemical polymerization using an oxidant with monomers dissolved in a solvent, high-pressure polymerization performed with applied pressure, a solution-dipping method of oxidation polymerization of monomers on a surface of a polymer film, or vapor polymerization via collision of monomers in a vapor phase above an oxidant-containing polymer membrane. In some embodiments, the water-soluble electroconductive polymer may be used as a binder in slurry for forming lithium batteries, and thus may be prepared using chemical polymerization or high-pressure polymerization.

In some embodiments, the polymers of Formulae 1 to 8 and copolymers thereof may be prepared via modification of a conducting polymer with none or some of the above-listed substituents.

At least one of the polymers of Formulae 1 to 8, and copolymers thereof (for example, of Formulae 9 and 10), or a mixture of at least two thereof may be used as the binder.

Some embodiments provide a binder for a lithium battery electrode, the binder comprising a water-soluble electroconductive polymer having a a moiety represented by the following formula:

wherein:
each $L^1$ may be independently selected from the group consisting of:

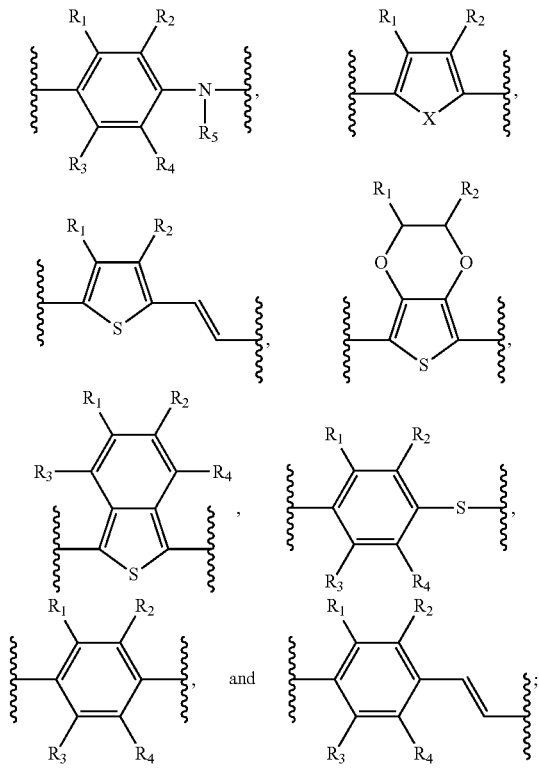

each X may be at least one of NH, N-alkyl, or S (sulfur);
$R_1$, $R_2$, $R_3$, and $R_4$ may each independently be a hydrogen (H), —R—SO$_3^-$M$^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —COO$^-$M$^+$, or —R—COO$^-$M$^+$ provided at least one of $R_1$, $R_2$, $R_3$, and $R_4$ is —COOH, —R—COOH, —COO$^-$M$^+$ or —R—COO$^-$M$^+$;
each $R_5$ may independently be a hydrogen (H), —R—COO$^-$M$^+$, or —R—SO$_3^-$M$^+$;
each R independently comprises at least one of a carbonyl group (—CO—), an oxy group (—O—), a carbonyloxy group (—COO— or —OCO—), an aminocarbonyl group (—NH$_2$—CO— or —CO—NH$_2$—), an aminosulfonyl group (—NH$_2$—SO$_2$— or —SO$_2$—NH$_2$—), a mercapto group (—S—), a sulfinyl group (—S(O)—), a sulfonyl group (—SO$_2$—), a sulfonyloxy group (—SO$_2$—O— or —O—SO$_2$—), or a secondary amine group (—NH—); each M$^+$ is a metal cation or an alkylated ammonium ion; and n is an integer from 10 to 10,000. In some embodiments, each $L^1$ may be independently selected from the group consisting of:

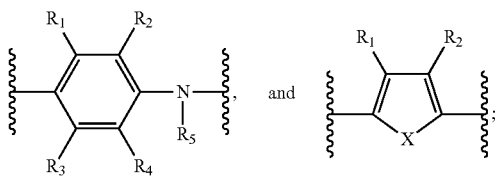

each X may be at least one of NH, or S (sulfur);
$R_1$, $R_2$, $R_3$, and $R_4$ may each independently be a hydrogen (H), —SO$_3^-$Na$^+$, —OCH$_3$, —R—COOH, —R—COO$^-$Na$^+$, —COOH, or —COO$^-$Na$^+$ provided at least one of $R_1$, $R_2$, $R_3$, and $R_4$ is —R—COOH, —R—COO$^-$Na$^+$, —COOH, or —COO$^-$Na$^+$; $R_5$ may be hydrogen (H); and R may be a linear C1-C3 saturated hydrocarbon group.

In some embodiments, the water-soluble electroconductive polymer may be self-doped by including a carboxylate functional group. When self-doped by the carboxylate functional group, the water-soluble electroconductive polymer may not need a further doping agent. In some embodiments, the water-soluble electroconductive polymer may introduce the carboxylate functional group after polymer formation to provide the self-doped water-soluble electroconductive polymer. In some embodiments, the subunits for polymerization include a carboxylate functional group and polymerization provides the self-doped water-soluble electroconductive polymer. In some embodiments, the carboxylate functional group may render a polymer including polyaniline, polypyrrole, polythiophene, or the like sub-units water-soluble, and may also serve as a dopant, so that polyaniline, polypyrrole, polythiophene, or the like forming the main chain of the water-soluble electroconductive polymer may be self-doped through oxidation doping of the carboxylate functional group. In some embodiments, the self-doping may further improve the electrical conductivity of the water-soluble electroconductive polymer. Whether the water-soluble electroconductive polymer is self-doped or not may be determined by measuring surface resistances of electrodes manufactured using the water-soluble electroconductive polymers before and after being self-doped. When using the self-doped water-soluble electroconductive polymer, the electrode may have a reduced surface resistance, as compared to when using the non-self-doped water-soluble electroconductive polymer.

In some embodiments, the water-soluble electroconductive polymer may further include a functional group with at least one of a carboxyl group, a phosphoric acid group, a phosphate group, a sulfonic acid group, and a sulfonate group at a terminal thereof. These functional groups may further improve the water solubility of the water-soluble electroconductive polymer. For example, when having a functional group with a phosphoric acid group, a phosphate group, a sulfonic acid group, or a sulfonate group at a terminal thereof, the water-soluble electroconductive polymer may have further improved water solubility.

Since a carboxyl group, a phosphoric acid group, a phosphate group, a sulfonic acid group, or a sulfonate group may serve as a dopant for the water-soluble electroconductive polymer, the water-soluble electroconductive polymer may also be self-doped with these functional groups.

In some embodiments, the water-soluble electroconductive polymer may have an electrical conductivity of about 0.01 S/cm or greater. When the water-soluble electroconductive polymer is self-doped, it may have further improved electrical conductivity as described above, for example, an electrical conductivity of about 1.0 S/cm or greater.

In some embodiments, as the binder, the water-soluble electroconductive polymer may be used alone or in a combination with an additional binder resin for improved dispersibility of an active material, improved binding strength to the active material and a current collector, and improved elasticity. When using water as a solvent for dispersing the water-soluble electroconductive polymer, the additional binder resin to be mixed with the water-soluble electroconductive polymer may be water soluble or a dispersion in water. Examples of the binder resin are polyvinylalcohol, polyacrylic acid and a salt thereof, polymethacrylic acid and a salt thereof, polyacrylic acid copolymer and a salt thereof, polymethacrylic acid copolymer and a salt thereof, polyacrylamide, polyacrylamide copolymer, (modified) butadiene-based rubber emulsion, (modified) styrene-butadiene based rubber emulsion, and (modified) urethane-based rubber emulsion.

In some embodiments, a solvent for dispersing the water-soluble electroconductive polymer may be a polar organic solvent, other than water. With the use of the polar organic solvent, the selection range of available additional binders may widen, However, a binder system using water, rather than an organic solvent, as a solvent may be used in terms of environmental friendliness.

In some embodiments, an amount of the water-soluble electroconductive polymer in the binder may be about 50% to about 100 wt % based on a total weight of the binder. When the amount of the water-soluble electroconductive polymer is within this range, improved characteristics may be obtained. An amount of the additional binder resin added for further improvement of characteristics may be about 50 wt % or less based on the total weight of the binder.

According to another embodiment, a binder composition for a lithium battery electrode includes the binder including the above-described water-soluble electroconductive polymer.

To prepare an electrode slurry by mixing the binder, an active material, and other additives together, first, the binder is dissolved in a solvent, for example, water, to prepare a binder solution. If the binder has a low solubility to the solvent, so a solid binder content in a resulting composition is too low relative to the amount of the solvent, the composition may not have a satisfactory viscosity. In this regard, the solid content of the binder solution may be about 1 wt % or greater, and in some embodiments, about 2 wt % or greater.

In some embodiments, the binder composition may further include an additive for further improvement of characteristics of a lithium battery. Examples of the additive are a dispersing agent, a thickening agent, a conducting agent, and a filling agent. These additives may be used as a mixture with the binder composition, or may be individually added in preparing the slurry for forming an electrode. The kinds of these additives may be selected depending on the kinds of the active material and binder. In some embodiments, these additives may not be used. An amount of the additive may vary depending on the kind of the active material, the composition of the binder, and the kinds of the additive. For example, the amount of the additive may be from about 0.1 parts to about 10 parts by weight based on 100 parts by weight of the binder.

In some embodiments, the dispersing agent may be any material that is electrochemically stable, and is able to improve the dispersibilities of the positive or negative active material and the conducting agent in the binder composition. In some embodiments, the dispersing agent may be selected from among a cationic dispersing agent, an anionic dispersing agent, and a non-ionic dispersing agent. In some embodiments, the dispersing agent may include a lipophilic moiety having one or more selected from among a C5-C20 hydrocarbon, an acryl oligomer, an ethylene oxide oligomer, a propylene oxide oligomer, an ethylene oxide, a propylene oxide oligomer, and urethane oligomer.

In some embodiments, the thickening agent may be added when the binder composition has a low viscosity, to facilitate coating of the binder composition onto the current collector. For example, the thickening agent may be at least one selected from among carboxymethyl cellulose, carboxyethyl cellulose, ethyl cellulose, hydroxymethyl cellulose, hydroxyethyl cellulose, hydroxypropyl cellulose, and polyvinylalcohol.

In some embodiments, the conducting agent, which is for further improving a conduction path of the electrode, may be any electron-conducting material that may not cause a chemical change in a battery. For example, the conducting agent may be at least one conducting material selected from natural graphite, artificial graphite, carbon nanofibers, carbon black, acetylene black, Ketjen black, metal powder such as copper, nickel, aluminum, silver, and the like.

In some embodiments, the filling agent as an auxiliary component for improving the strength of the binder to suppress swelling of the electrode may be at least one material selected from among fibrous materials, such as glass fiber, carbon fiber, and metal fiber.

In some embodiments, the solvent for the binder composition may be water, or at least one polar organic solvent selected from among N,N-dimethylformamide, N,N-dimethylacetamide, methylethylketone, cyclohexanone, acetic acid ethyl, acetic acid butyl, cellosolveacetate, propyleneglycol monomethylether acetate, methylcellosolve, butylcellosolve, methylcarbitol, butylcarbitol, propyleneglycol monomethylether, diethyleneglycol dimethylether, toluene, and xylene. In some embodiments, the solvent may be a mixture of water and at least one of these polar organic solvents. An amount of the solvent is not specifically limited, and may be enough to provide the binder composition with an appropriate viscosity.

In some embodiments, the binder composition for forming an electrode may be prepared from a mixture of the above-described components, and may form a slurry for the electrode when further mixed with an electrode active material.

For example, a positive active material as the electrode active material may be any lithiated intercalation compound that allows reversible intercalation and deintercation of lithium. For example, the positive active material may be at least one selected from among lithium cobalt oxide ($LiCoO_2$); lithium nickel oxide ($LiNiO_2$); lithium manganese oxides, such as $Li_{1+x}Mn_{2-x}O_4$ (where x is 0-0.33), $LiMnO_3$, $LiMn_2O_3$, and $LiMnO_2$; lithium copper oxide ($Li_2CuO_2$); lithium iron oxide (Formula $LiFe_3O_4$); lithium vanadium oxide ($LiV_3O_8$); copper vanadium oxide ($Cu_2V_2O_7$); vanadium oxide ($V_2O_5$); Ni-site type lithium nickel oxides, such as $LiNi_{1-x}M_xO_2$ (where M=Co, Mn, Al, Cu, Fe, Mg, B, or Ga; and x=0.01~0.3) and $LiNi_{1-x-y}Co_xMn_yO_2$ (where $0 \leq x \leq 0.5$, $0 \leq y \leq 0.5$); lithium-manganese composite oxides such as $LiMn_{2-x}M_xO_2$ (where M=Co, Ni, Fe, Cr, Zn, or Ta; and x=0.01~0.1) or $Li_2Mn_3MO_8$ (where M=Fe, Co, Ni, Cu, or Zn); lithium manganese oxides ($LiMn_2O_4$) with a part of Li substituted with alkali earth metal ions; disulfide compounds; and iron molybdenum oxide ($Fe_2(MoO_4)_3$), but is not limited thereto.

A negative active material as the electrode active material may be, for example, crystalline carbon, amorphous carbon, or a combination thereof. An example of the crystalline carbon is graphite, such as natural or artificial graphite in amorphous, plate, flake, spherical, or fibrous form. Examples of the amorphous carbon are soft carbon (sintered at low temperatures), hard carbon, meso-phase pitch carbides, sintered corks, and the like. In some other embodiments, the negative active material may be selected from among Si, $SiO_x$ (where 0<x<2), Sn, $SnO_2$, a silicon-containing metal alloy, and a mixture thereof. A metal for the silicon-containing metal alloy may be at least one selected from among aluminum (Al), tin (Sn), silver (Ag), iron (Fe), bismuth (Bi), magnesium (Mg), zinc (Zn), indium (In), germanium (Ge), lead (Pb), and titanium (Ti).

In some embodiments, the slurry for forming an electrode, which is obtained using the binder composition and the active material, is coated on a current collector, and heated, followed by further heat treatment in vacuum to form an electrode active material layer. In some embodiments, the coating may be performed using one of the methods selected from among screen printing, spray coating, coating using a doctor blade, Gravure coating, dip coating, silk screen, painting, and coating using a slot die, depending on the viscosity of the slurry.

The current collector may be either a positive electrode current collector or a negative electrode current collector. In general, the positive electrode current collector may have a thickness of from about 3 μm to about 500 μm. The positive electrode current collector may be any material having a high conductivity without causing a chemical change in the lithium battery, for example, stainless steel, aluminum, nickel, titanium, sintered carbon, or aluminum or stainless steel of which a surface is treated with carbon, nickel, titanium, silver, or the like. In some embodiments, the positive electrode current collector may have fine irregularities on a surface thereof so as to have enhanced adhesive strength to the positive active material. The positive electrode current collector may be in any of various forms, including a film, a sheet, a foil, a net, a porous structure, foam, and non-woven fabric.

Similar to the positive electrode current collector, in general the negative electrode current collector may have a thickness of from about 3 μm to about 500 μm. The negative electrode current collector may be any material having a conductivity without causing a chemical change in the lithium battery, for example, copper, stainless steel, aluminum, nickel, titanium, sintered carbon, or copper or stainless steel of which a surface is treated with carbon, nickel, titanium, silver, or the like, or an aluminum-cadmium alloy. In some embodiments, the negative electrode current collector may have fine irregularities on a surface thereof so as to have improved adhesion to the negative active material. In some embodiments, the negative electrode current collector may be in any of various forms, including a film, a sheet, a foil, a net, a porous structure, foam, and non-woven fabric.

In some embodiments, the coating of the slurry for forming an electrode on the current collector is followed by a drying process, which may be, for example, a primary thermal treatment performed at a temperature of about 80° C. to 120° C., and in some embodiments, at a temperature of about 90° C., to evaporate the solvent from the coated slurry. The drying process may be performed in an atmospheric condition. After completely evaporating the solvent from the slurry coated on the current collector through the primary thermal treatment, a secondary thermal treatment may be performed in vacuum. For example, the secondary thermal treatment may be performed in a vacuum of about $1\times10^{-4}$ to $1\times10^{-6}$ torr at a temperature of about 100° C. to 200° C., and in some embodiments, at a temperature of about 110° C. to 180° C., to minimize the moisture content in an electrode.

Some embodiments provide a lithium battery includes: a positive electrode; a negative electrode disposed opposite to the positive electrode; and an electrolyte disposed between the positive electrode and the negative electrode, wherein at least one of the positive electrode and the negative electrode includes the above-described binder.

The positive electrode and the negative electrode may be separated from one another by a separator. The separator may be any separator that is in common use in lithium batteries, for example, a separator with low resistance to migration of ions in an electrolyte and having electrolyte-retaining ability. For example, the separator may be a material selected from among glass fiber, polyester, polyethylene, polypropylene, polytetrafluoroethylene (PTFE), and a combination thereof, which may be a non-woven fabric or woven fabric. In some embodiments, the separator may have a pore diameter of about 0.01 μm to 10 μm, and a thickness of about 3 μm to 20 μm. When a solid electrolyte, such as a polymer electrolyte, is used as the electrolyte, the solid electrolyte may also serve as the separator.

As the separator, a multi-layer of olefin-based polymers, for example, a multi-layer including two or more layers of polyethylene, polypropylene, polyvinylidene fluoride, or a combination thereof, may be used. For example, the separator may be a mixed multi-layer, for example, a two-layer separator including polyethylene and polypropylene layers, a three-layer separator including polyethylene, polypropylene, and polyethylene layers, or a three-layer separator including polypropylene, polyethylene, and polypropylene layers.

In some embodiments, the electrolyte may be a lithium salt-containing non-aqueous electrolyte. For example, the non-aqueous electrolyte may be a non-aqueous liquid electrolyte, an organic solid electrolyte, or an inorganic solid electrolyte.

Non-limiting examples of the non-aqueous liquid electrolyte are any of aprotic organic solvents such as N-methyl-2-pyrrolidone, propylene carbonate, ethylene carbonate (EC), butylene carbonate, dimethyl carbonate, diethyl carbonate (DEC), γ-butyrolactone, 1,2-dimethoxy ethane, tetrahydroxyfuran, 2-methyl tetrahydrofuran, dimethylsulfoxide, 1,3-dioxolane, formamide, dimethylformamide, acetonitrile, nitromethane, methyl formate, methyl acetate, phosphoric acid trimester, trimethoxy methane, sulfolane, methyl sulfolane, 1,3-dimethyl-2-imidazolidinone, propylene carbonate derivatives, ether, methyl propionate, and ethyl propionate.

Non-limiting examples of the organic solid electrolyte are polyethylene derivatives, polyethylene oxide derivatives, polypropylene oxide derivatives, phosphoric acid ester polymers, poly agitation lysine, polyester sulfide, polyvinyl alcohols, polyvinylidene fluoride, and polymers containing ionic dissociation groups.

Non-limiting examples of the inorganic solid electrolyte are nitrides, halides, sulfates, and silicates of lithium, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, and $Li_3PO_4$—$Li_2S$—$SiS_2$.

The lithium salt may be any lithium salt that is in common use for lithium batteries, for example, any lithium salt that is soluble in the above-mentioned non-aqueous electrolytes. For example, the lithium salt may be at least one of LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic carboxylic acid lithium, lithium tetraphenyl borate, and lithium imide.

To improve charging/discharging characteristics and flame retarding characteristics of a lithium battery, an additive, for example, pyridine, triethylphosphate, triethanolamine, cyclic ether, ethylenediamine, n-glyme, hexaphosphoric acid triamide, nitrobenzene derivative, sulfur, quinone imine dye, N-substituted oxazolidinone, N,N-substituted imidazolidine, ethylene glycol dialkyl ether, ammonium salt, pyrrole, 2-methoxy ethanol, or aluminum trichloride, may be added to the non-aqueous electrolyte. In some embodiments, to render inflammable, the non-aqueous electrolyte may further include a halogen-containing solvent, such as carbon tetrachloride or ethylene trifluoride. In some other embodiments, to improve the high-temperature storage characteristics of the non-aqueous electrolyte, carbon dioxide gas may be further incorporated into the non-aqueous electrolyte.

Lithium batteries may be classified as lithium ion batteries, lithium ion polymer batteries, or lithium polymer batteries, according to the type of separator and/or electrolyte included therein. In addition, lithium batteries may be classified as cylindrical type, rectangular type, coin type, or pouch type, according to the shape thereof. Lithium batteries may also be classified as either bulk type or thin film type, according to the size thereof.

In addition, lithium primary batteries and lithium secondary batteries are available.

FIG. 1 is a schematic perspective view of a lithium battery 30 according to an embodiment of the present invention.

Referring to FIG. 1, the lithium battery 30 includes a positive electrode 23, a negative electrode 22, and a separator 24 disposed between the positive electrode 23 and the negative electrode 22.

In some embodiments, the positive electrode 23, the negative electrode 22, and the separator 24 are wound or folded, and then accommodated in a battery case 25.

Subsequently, an electrolyte may be injected into the battery case 25 and the battery case 25 is sealed by a sealing member 26, thereby completing the manufacture of the lithium battery 30.

In some embodiments, the battery case 5 may have a cylindrical shape, a rectangular shape or a thin-film shape.

In some embodiments, the lithium battery 30 may be a lithium ion battery.

In some embodiments, the lithium battery 30 may be suitable for use as power sources for electric vehicles and power tool requiring high capacity, high-power output, and operation under high temperature conditions, in addition to power sources for conventional mobile phones and portable computers, and may be coupled to conventional internal combustion engines, fuel cells, or super-capacitors to be used in hybrid vehicles.

In addition, the lithium battery may be used in any applications requiring high-power output, high voltage, and operation under high temperature conditions.

Thereinafter, one or more embodiments of the present disclosure will be described in detail with reference to the following examples. However, these examples are not intended to limit the scope of the one or more embodiments of the present disclosure.

EXAMPLES

Example 1

Synthesis of Water-Soluble Electroconductive Binder 1-1. Preparation of poly(aniline-co-2-aminoterephthalic acid-co-sodium 2-methoxyaniline-5-sulfonate)

Aniline (1.12 g, 12 mmol), 2-aminoterephthalic acid (3.26 g, 18 mmol), and sodium 2-methoxyaniline-5-sulfonate (6.75 g, 30 mmol) were dissolved in water (50 mL) in a mixing vessel at room temperature, followed by addition of 10 wt % aqueous solution of aniline hydrochloride (1 g) and 10 wt % aqueous solution of ferrous sulfate (5 g) thereto to obtain a mixture. Subsequently, the mixture was stirred to obtain a homogeneous solution. This solution was moved into a Teflon reaction vessel for high-pressure polymerization, and a 20 wt % aqueous solution of sodium sulfate (80 g) was added thereto, homogeneously mixed, and then kept at room temperature at a pressure of about 15 kbar for about 24 hours. Subsequently, the crude material was purified via dialysis for several days, and the resulting material was dried under vacuum to obtain a polymer having the subunits in the ratio shown in Structure A (poly(aniline-co-2-aminoterephthalic acid-co-sodium 2-methoxyaniline-5-sulfonate)) as a powder with an average weight molecular weight of about 23,000 g/mol. Structure A provides the ratio of the subunits and is not intended to limit the order or direction of connectivity of the subunits in the polymer.

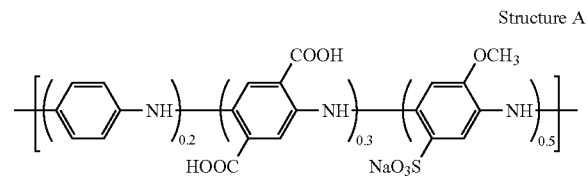

Structure A 5 g of the polymer having the subunits in the ratio shown in Structure A was dissolved in 45 g of pure water to prepare an aqueous solution A with about 10 wt % solid content.

1-2. Preparation of poly(3-(3-thienyl)-propionic acid-co-sodium 3-(3-thienyl)-propionate)

3-(3-Thienyl)-propionic acid (4.69 g, 30 mmol) and sodium 3-(3-thienyl)-propionate (5.35 g, 30 mmol) were dissolved in water (50 mL) in a mixing vessel at room temperature, and then processed in the same manner as in the preparation method of Section 1-1 above to obtain a polymer having the subunits in the ratio shown in Structure B (poly(3-(3-thienyl)-propionic acid-co-sodium 3-(3-thienyl)-propionate)) as a powder with an average weight molecular weight of about 17,000 g/mol. Structure B provides the ratio of the subunits and is not intended limit the order or direction of connectivity of the subunits in the polymer.

Structure B

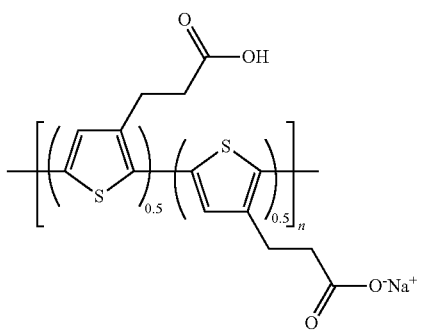

5 g of the polymer having the subunits in the ratio shown in Structure B was dissolved in 45 g of pure water to prepare an aqueous solution B with about 10 wt % solid content.

1-3. Preparation of poly(sodium pyrrole-3-carboxylate)

Sodium pyrrole-3-carboxylate (7.98 g, 60 mmol) was dissolved in water (50 mL) in a mixing vessel at room temperature, and then processed in the same manner as in the preparation method of Section 1-1 above to obtain a polymer having the subunits in the ratio shown in Structure C (poly(sodium pyrrole-3-carboxylate)) as a powder with an average weight molecular weight of about 28,000 g/mol.

Structure C

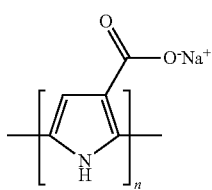

5 g of the polymer having the subunit in Structure C was dissolved in 45 g of pure water to prepare an aqueous solution C with about 10 wt % solid content.

Example 2

Slurry Preparation

2-1. Preparation of Positive Electrode Slurry 1

9.0 g of aqueous solution A with 10 wt % solid content prepared in Section 1-1 above, 0.25 g of an acryl-based (n-butyl acrylate-co-styrene-co-acylic acid) emulsion (average particle diameter 120 nm) with 40 wt % solid content, 18.6 g of a positive active material (LiCoO$_2$, having an average particle diameter of about 6.4 µm and a specific surface area of about 0.68 m/g), and 0.4 g of a conducting agent (carbon nanofiber (CNF), having a fiber length of about 10~20 µm, a fiber diameter of about 160 nm, and a specific surface area of about 15 m$^2$/g) were homogeneously dispersed in a slurry preparation vessel to obtain a positive electrode slurry 1 with the positive active material and the conducting agent homogeneously dispersed. A small amount of water was added in the preparation of the positive electrode slurry 1 to appropriately adjust the viscosity thereof.

2-2. Preparation of Comparative Positive Electrode Slurry 1

5.0 g of a polyvinylidene fluoride (PVdF) (average molecular weight (Mw)=500,000~600,000 g/mol) solution with 20 wt % solid content in N-methylpyrrolidone (NMP), 18.0 g of a positive active material (LiCoO$_2$, having an average particle diameter of about 6.4 µm and a specific surface area of about 0.68 m$^2$/g), and 1.0 g of a conducting agent (CNF, having a fiber length of about 10-20 µm, a fiber diameter of about 160 nm, and a specific surface area of about 15 m$^2$/g) were homogeneously dispersed in a slurry preparation vessel to obtain a comparative positive electrode slurry 1 with the positive active material and the conducting agent homogeneously dispersed. A small amount of NMP was added in the preparation of the comparative positive electrode slurry 1 to appropriately adjust the viscosity thereof.

2-3. Preparation of Negative Electrode Slurry 1

9.0 g of aqueous solution B with 10 wt % solid content prepared in Section 1-2 above, 0.25 g of an aqueous SBR-based (styrene-co-butadiene-acrylic acid) emulsion (having an average particle diameter of about 100 nm) with 40 wt % solid content, and 19.0 g of mixed powder of a Si—Ti—Ni-based Si-alloy (having an average particle diameter of about 5 µm) and graphite in a weight ratio of 2:8 were dispersed in a slurry preparation vessel to obtain a negative electrode entitled slurry 1 with stable dispersibility. A small amount of water was added in the preparation of the negative electrode slurry 1 to appropriately adjust the viscosity thereof.

2-4. Preparation of Negative Electrode Slurry 2

8.0 g of aqueous solution C with 10 wt % solid content prepared in Section 1-3 above, 1.0 g of aqueous solution of poly(vinyl alcohol) (PVA) (having an average molecular weight (Mw)=25,000 g/mol and a degree of saponification of 99%) with 10 wt % solid content, 1.0 g of aqueous solution of poly(acrylic acid) (PAA) (having an average molecular weight (Mw)=450,000 g/mol) with 10 wt % solid content, and 19.0 g of the mixed powder of a Si-alloy and graphite (as used in Section 2-3 above) were dispersed in a slurry preparation vessel to obtain a negative electrode entitled slurry 2 with stable dispersibility. A small amount of water was added in the preparation of the negative electrode slurry 2 to appropriately adjust the viscosity thereof.

2-5. Preparation of Comparative Negative Electrode Slurry 1

5.0 g of an aqueous solution of PVA (having an average molecular weight (Mw)=25,000 g/mol and a degree of saponification of 99%) with 10 wt % solid content, 5.0 g of an aqueous solution of PAA (having an average molecular weight (Mw)=450,000 g/mol) with 10 wt % solid content, and 19.0 g of the mixed powder of a Si-alloy and graphite (as used in Section 2-3 above) were dispersed in a slurry preparation vessel to obtain a comparative negative electrode slurry 1 with stable dispersibility. A small amount of NMP was added in the preparation of the comparative negative electrode slurry 1 to appropriately adjust the viscosity thereof.

Example 3

Manufacture of Electrode and Battery

3-1. Manufacture of Battery Using Positive Electrode Slurry Composition

The positive electrode slurry compositions prepared in Sections 2-1 and 2-2 above were each coated on an aluminum foil, dried at about 110° C. for about 30 minutes (primary drying), and then subjected to punching into a coin cell, pressing, welding, and vacuum-drying (VD) at a drying temperature of about 150° C. for about 2 hours, thereby manufacturing a positive electrode.

A lithium secondary half cell was manufactured using the positive electrode for a lithium secondary battery, a Li metal as a counter electrode and a porous polypropylene film as a separator. 1M $LiPF_6$ dissolved in a mixed solution of ethylene carbonate and diethylene carbonate (a ratio of 1:1 by volume) was used as an electrolyte.

3-2. Manufacture of Battery Using Negative Electrode Slurry Composition

The negative electrode slurry compositions prepared in Sections 2-3, 2-4, and 2-5 above were each coated on a copper foil, dried at about 110° C. for about 30 minutes (primary drying), and then subjected to punching into a coin cell, pressing, welding, and vacuum-drying (VD) at a drying temperature of about 150° C. (at about 350° C. for the comparative negative electrode slurry) for about 2 hours, thereby manufacturing a negative electrode.

A lithium secondary half cell was manufactured using the negative electrode for a lithium secondary battery, a Li metal as a counter electrode, and a porous polypropylene film as a separator. IM $LiPF_6$ dissolved in a mixed solution of ethylene carbonate and diethylene carbonate (a ratio of 1:1 by volume) was used as an electrolyte. The lithium secondary half cell was assembled in a glove box filled with argon gas, and then subjected to electrode characteristic evaluation using a 100 mA-charger/discharger.

Example 4

Battery Characteristic Evaluation

4.1 Positive Electrode Evaluation

The coin cell manufactured in Section 3-1 above for an evaluation of battery characteristics was fully charged at room temperature at a constant current of 0.2 C, 1.0 C at a constant voltage (an upper limit voltage of about 4.2V), and then discharged at the same constant current rate as for the charging to a lower limit discharge voltage of about 3.0V. This one cycle of charging and discharging was repeated fifty times, and then charging/discharging cycle characteristics of the cell were evaluated. For a more accurate evaluation, the evaluation test was repeatedly performed on four coin cells that were manufactured in the same conditions. The evaluation results are shown in Table 1 below.

TABLE 1

| Slurry | Discharge rate | Initial discharge capacity, mAh/g | Discharge capacity (@50 cycle), mAh/g | Discharge capacity retention rate (@50 cycle), % |
|---|---|---|---|---|
| Positive electrode slurry 1 | 0.2 C | 133 | 129 | 97% |
|  | 1.0 C | 129 | 121 | 94% |
| Comparative positive electrode slurry 1 | 0.2 C | 128 | 123 | 95% |
|  | 1.0 C | 121 | 109 | 90% |

Referring to the evaluation results in Table 1 above, the cell manufactured using the positive electrode slurry 1 was found to have a higher initial discharge capacity than the cell manufactured using the comparative positive electrode slurry 1. This is attributed to the use of the binder having Structure A with a high conductivity, which consequently led to the use of a reduced amount of the conducting agent, an increased amount of the positive active material, and ultimately, an increased capacity.

The cell manufactured using the positive electrode slurry 1 was found to have a relatively high discharge capacity retention rate, which is also attributed to the use of the binder with high conductivity, which consequently results in a battery with improved conductivity with less deterioration caused by electrical resistance, and thus an increased lifetime.

4.2 Negative Electrode Evaluation

The coin cell manufactured in Section 3-2 above for an evaluation of battery characteristics was fully charged at room temperature at a constant current of 0.2 C, 1.0 C at a constant voltage (an upper limit voltage of about 0.5V), and then discharged at the same constant current rate as for the charging to a discharge voltage of about 1.5V. This one cycle of charging and discharging was repeated fifty times, and then charging/discharging cycle characteristics of the cell were evaluated. For a more accurate evaluation, the evaluation test was repeatedly performed on four coin cells that were manufactured in the same conditions. The evaluation results are shown in Table 2 below.

TABLE 2

| Slurry | Discharge rate | Initial discharge capacity, mAh/cc | Discharge capacity (@50 cycle), mAh/cc | Discharge capacity retention rate (@50 cycle), % |
|---|---|---|---|---|
| Negative electrode slurry 1 | 0.2 C | 1150 | 1080 | 94% |
|  | 1.0 C | 950 | 827 | 87% |
| Negative electrode slurry 2 | 0.2 C | 1148 | 1068 | 93% |
|  | 1.0 C | 945 | 803 | 85% |
| Comparative negative electrode slurry 1 | 0.2 C | 1150 | 997 | 89% |
|  | 1.0 C | 820 | 623 | 76% |

Referring to the evaluation results in Table 2 above, the cells manufactured using the negative electrode slurries 1 and 2 were found to have relatively high discharge capacity retention rates, which is attributed to the use of the binder with high conductivity, which consequently results in a battery with improved conductivity with less deterioration caused by electrical resistance, and thus an increased lifetime.

As described above, according to embodiments of the present disclosure, the binder for a lithium battery may provide a high capacity to a lithium battery. The binder is water soluble, and thus may be compatible with environmentally friendly water-based processes.

In the present disclosure, the term "comparative" is used arbitrarily to simply identify a particular example or experimentation and should not be interpreted as admission of prior art. It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A binder for a lithium battery electrode, the binder comprising a water-soluble electroconductive polymer having a carboxylate functional group in a main chain, wherein the water-soluble electroconductive polymer with the carboxylate functional group in a main chain comprises a moiety represented by Formula 1:

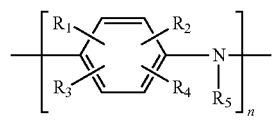

Formula 1 wherein:

$R_1$, $R_2$, $R_3$, and $R_4$ are each independently a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —$COO^-M^+$, or —R—$COO^-M^+$ provided at least one of $R_1$, $R_2$, $R_3$, and $R_4$ is —COOH, —R—COOH, —$COO^-M^+$ or —R—$COO^-M^+$;

each $R_5$ is independently hydrogen (H), —R—$COO^-M^+$, or —R—$SO_3^-M^+$;

each R independently comprises at least one of a linear or branched C1-C10 saturated or unsaturated hydrocarbon group, carbonyl group, an oxy group, a carbonyloxy group, an aminocarbonyl group, an aminosulfonyl group, a mercapto group, a sulfinyl group, a sulfonyl group, a sulfonyloxy group, or a secondary amine group; each $M^+$ is a metal cation or an alkylated ammonium ion; and n is an integer from 10 to 10,000, or wherein the water-soluble electroconductive polymer with the carboxylate functional group in a main chain comprises a moiety represented by Formula 2:

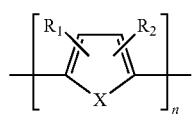

Formula 2 wherein:

X is NH, N-alkyl, or S (sulfur);

$R_1$ and $R_2$ are each independently a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —$COO^-M^+$, or —R—$COO^-M^+$ provided at least one of $R_1$ and $R_2$, is —$COO^-M^+$ or —R—$COO^-M^+$; each R independently comprises at least one of a linear or branched C1-C10 saturated or unsaturated hydrocarbon group, carbonyl group, an oxy group, a carbonyloxy group, an aminocarbonyl group, an aminosulfonyl group, a sulfanyl group, a sulfinyl group, a sulfonyl group, a sulfonyloxy group, or a secondary amine group; each $M^+$ is a metal cation or an alkylated ammonium ion; and n is an integer from 10 to 10,000.

2. The binder of claim 1, wherein R is a linear or branched C1-C10 saturated or unsaturated hydrocarbon group.

3. The binder of claim 1, wherein an amount of the water-soluble electroconductive polymer is from about 50 wt % to about 100 wt % based on a total weight of the binder.

4. A binder composition for a lithium battery electrode, the binder composition comprising the binder of claim 1, and a solvent.

5. The binder composition of claim 4, wherein a solid content of the binder composition is about 1 wt % or greater.

6. The binder composition of claim 4, wherein the solvent is an aqueous solvent, a polar organic solvent, or a mixture thereof.

7. A lithium battery comprising:
a positive electrode;
a negative electrode disposed opposite to the positive electrode; and
an electrolyte disposed between the positive electrode and the negative electrode, wherein at least one of the positive electrode and the negative electrode comprises the binder of claim 1.

8. A lithium battery comprising:
a positive electrode;
a negative electrode disposed opposite to the positive electrode; and
an electrolyte disposed between the positive electrode and the negative electrode, wherein at least one of the positive electrode and the negative electrode comprises binder comprising a water-soluble electroconductive polymer with a carboxylate functional group, wherein the water-soluble electroconductive polymer with the carboxylate functional group comprises a moiety represented by Formula 1:

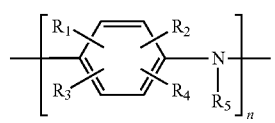

Formula 1 wherein:

$R_1$, $R_2$, $R_3$, and $R_4$ are each independently a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COOH, —R—COOH, —$COO^-M^+$, or —R—$COO^-M^+$ provided at least one of $R_1$, $R_2$, $R_3$, and $R_4$ is —COOH, —R—COOH, —$COO^-M^+$, or —R—$COO^-M^+$;

each $R_5$ is independently a hydrogen (H), —R—$COO^-M^+$, or —R—$SO_3^-M^+$;

each R independently comprises at least one of a carbonyl group, an oxy group, a carbonyloxy group, an aminocarbonyl group, an aminosulfonyl group, a mercapto group, a sulfinyl group, a sulfonyl group, a sulfonyloxy group, or a secondary amine group; each $M^+$ is a metal cation or an alkylated ammonium ion; and n is an integer from 10 to 10,000.

9. The lithium battery of claim 8, wherein $R_1$, $R_2$, $R_3$, and $R_4$ are each independently a hydrogen (H), —$SO_3^-Na^+$, —$OCH_3$, —R—COOH, —R—COO$^-$Na$^{30}$, —COOH, or —COO$^-$Na$^+$ provided at least one of $R_1$, $R_2$, $R_3$, and $R_4$ is —R—COOH, —R—COO$^-$Na$^+$, —COOH, or —COO$^-$Na$^+$; $R_5$ is hydrogen (H); and R is a linear C1-C3 saturated hydrocarbon group.

10. The lithium battery of claim 7, wherein the water-soluble electroconductive polymer with the carboxylate functional group comprises a moiety represented by Formula 2:

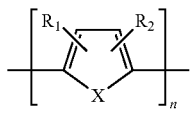

Formula 2 wherein:

X is at least one of NH, N-alkyl, or S (sulfur);

$R_1$ and $R_2$ are each independently a hydrogen (H), —R—$SO_3^-M^+$, a C1-C10 hydrocarbon with an alkoxy group, a hydroxy group, an amine group, an ester group, an amide group, a ketone group, a halogen atom, a nitro group, a cyano group, a trihalomethyl group, a phenyl group, a substituted phenyl group at a terminal thereof, a hydroxy group, a halogen atom, a nitro group, a cyano group, a trihalomethyl group, —COO$^-M^+$, or —R—COO$^-M^+$ provided at least one of $R_1$ and $R_2$, is —COO$^-M^+$ or —R—COO$^-M^+$; each R independently comprises at least one of a linear C 1-C3 saturated hydrocarbon group, a carbonyl group, an oxy group, a carbonyloxy group, an aminocarbonyl group, an aminosulfonyl group, a sulfanyl group, a sulfinyl group, a sulfonyl group, a sulfonyloxy group, or a secondary amine group; each $M^+$ is a metal cation or an alkylated ammonium ion; and n is an integer from 10 to 10,000.

11. The lithium battery of claim 10, wherein $R_1$, and $R_2$ are each independently a hydrogen (H), —$SO_3^-Na^+$, —$OCH_3$, —R—COOH, —R—COO$^-$Na$^+$, —COOH, or —COO$^-$Na$^+$ provided at least one of $R_1$, and $R_2$ is —R—COOH, —R—COO$^-$Na$^+$; and R is a linear C1-C3 saturated hydrocarbon group.

12. The lithium battery of claim 10, wherein X is NH, or S (sulfur).

* * * * *